United States Patent [19]

Niwa

[11] Patent Number: 4,698,573
[45] Date of Patent: Oct. 6, 1987

[54] NUMERICALLY CONTROLLED WORKING PROCESS

[75] Inventor: Tomomitsu Niwa, Aichi, Japan

[73] Assignee: Mitsubishi Denki Kabushiki Kaisha, Tokyo, Japan

[21] Appl. No.: 541,210

[22] Filed: Oct. 12, 1983

[30] Foreign Application Priority Data

Oct. 12, 1982 [JP] Japan ................................. 57-178708
Oct. 12, 1982 [JP] Japan ................................. 57-178709

[51] Int. Cl.⁴ ........................ B23Q 15/10; G05B 19/28
[52] U.S. Cl. .................................... 318/571; 364/474
[58] Field of Search ............... 318/560, 561, 571, 567, 318/603; 364/474, 475, 182.1

[56] References Cited

U.S. PATENT DOCUMENTS

| | | | |
|---|---|---|---|
| 4,350,941 | 9/1982 | McClure et al. ..................... | 364/474 |
| 4,404,507 | 9/1983 | Dean et al. .......................... | 318/573 |
| 4,415,977 | 11/1983 | Fukuyama ........................... | 364/474 |
| 4,445,182 | 4/1984 | Morita et al. ....................... | 318/572 |
| 4,477,754 | 10/1984 | Roche et al. ........................ | 318/572 |

Primary Examiner—Bernard Roskoski
Attorney, Agent, or Firm—Sughrue, Mion, Zinn, Macpeak, and Seas

[57] ABSTRACT

A numerically controlled working process for a machine tool or the like is improved by reducing the idle time of the tool. This is effected by inputting the pre-working shape of the workpiece and comparing this shape with a tool path determined on the basis of the desired finished shape. When the working path of the tool passes through an area where no machining takes place (the workpiece, for example, being precut in this area) the tool is made to move at a relatively high speed to the next actual machining location.

5 Claims, 14 Drawing Figures

FIG. 10(a)
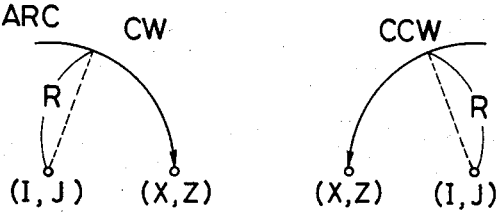
FIG. 10(b)
FIG. 11
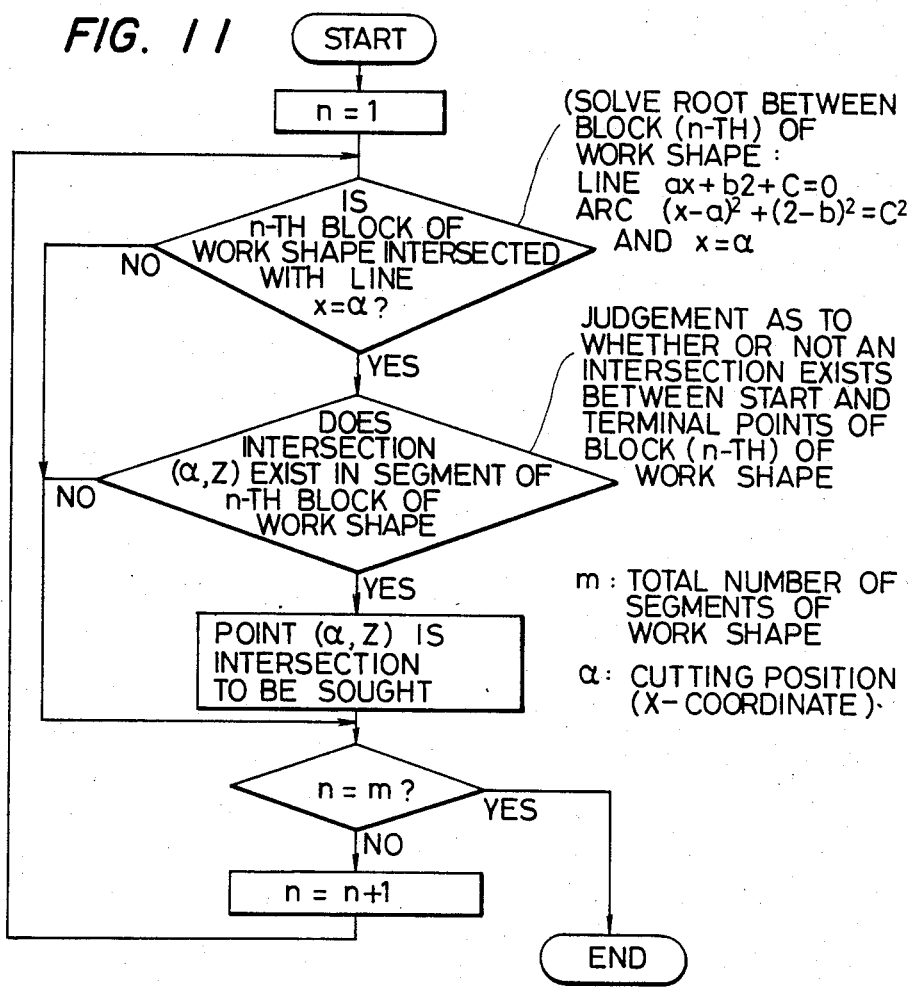

4,698,573

NUMERICALLY CONTROLLED WORKING PROCESS

BACKGROUND OF THE INVENTION

The present invention relates to a numerically controlled working process (hereinafter referred to as an NC working process) for working an object (hereinafter referred to as the work or workpiece) by controlling a working machine by means of a numerically controlling device (hereinafter referred to as an NC device), and, particularly, to an NC working process for machining a workpiece according to a predetermined fashion.

In a numerically controlled working machine (hereinafter referred to as an NC working machine) controlled by an NC device, the tool position with respect to the work is instructed by numerical information corresponding to the tool position, and an operation or the like is performed under the control of the NC device, so that the work is machined using calculated values or the like. By means of such an NC working machine, a work can be easily machined into a complicated shape with high accuracy, and productivity can be improved.

Generally, an NC working machine is constituted, as shown in FIG. 1, by an NC device 20 for operating upon numerical information commands externally inputted through a terminal 10, and a working machine 30 controlled using the values calculated in the NC device 20. The NC device 20 comprises an input section 21, an operation section 22 for processing commands from the input section 21, a memory section 23 for storing the results of processing in the operation section 22 or the instructions from the input section 21, a control section 24 for controlling the processing of the operation section 22, and an output section 25 for externally outputting processed values.

In the working machine 30, a tool 31 is attached to a tool holder 32 which is in turn attached to a chuck of a spindle 33. The spindle 33 is rotated by a spindle motor 34 which is driven by a signal from the output section 25 of the NC device 20. A workpiece 40 is fixed onto a table 35 of the working machine 30 by means of a jig or the like. In FIG. 1, reference numeral 36 designates a ball screw for moving the table 35 in the direction of the X-axis. The ball screw 36 is driven by an X-axis feed motor 38 through a gear box 37. The X-axis feed motor 38 is driven by a signal from the output section 25 of the NC device 20. Similarly to the arrangement for the X-axis, mechanisms (not shown) are provided for moving the table 35 in the Y-axis and Z-axis directions respectively, and are driven by a signal from the NC device 20.

An example will be described hereunder in which the NC working process as outlined above is applied to a lathe.

In FIG. 2, which is a schematic diagram of a lathe, a cylindrical work 2 is supported at one end by a forward end portion 3a of a tail 3 and is positioned and fixed in a chuck 1 rotated about a rotary axis (Z-axis). A tool 5 for cutting the work 2 is fixed onto a capstan rest 4. In cutting the work 2, the capstan rest 4 is moved in the direction Z, as indicated by an arrow, whereby the work 2 is cut.

In FIG. 3, the work 2 is illustrated by a solid line, the final shape 6 of the work 2 is shown by a two-dot chain line, and the cut portion 7 of the work 2 is shown by oblique lines.

In FIG. 4, the working path for obtaining the final shape 6 is shown and consists of working path elements $l_1$, $l_2$, $l_3$, and $l_4$. The tool 5 is caused to move along the working path in the order of the original point $Q_0 \rightarrow$ a path $m_1 \rightarrow$ a first working start point $Q_1 \rightarrow$ working path element $l_1 \rightarrow$ a second working start point $Q_2 \rightarrow$ working path element $l_2 \rightarrow$ a third working start point $Q_3 \rightarrow$ working path element $l_3 \rightarrow$ a fourth working start point $Q_4 \rightarrow$ working path element $l_4 \rightarrow$ a path $m_2 \rightarrow$ the original point $Q_0$, to thereby obtain the final worked shape 6.

In the conventional NC working process, there is a problem in that when a final shape for the work is inputted, the working path is determined regardless of the shape of the workpiece before machining, so that the amount of useless movement of the tool increases depending on the shape of the workpiece before machining, sometimes resulting in a very wasteful operation. This problem will be discussed hereunder referring to FIGS. 5 and 6.

In FIG. 5, by way of example, a piece 2 which has been cut in advance is shown, and in FIG. 6, the working path for obtaining a final shape 6 is illustrated. Thus, the same working path as that in FIG. 4 is set in accordance with the desired final shape even for a preworked workpiece. In FIG. 8, the working paths $l_1$, $l_2$, $l_3$ and $l_4$ are set without regard to the shape of the workpiece before machining, and therefore in this case the tool 5 is caused to move at a relatively slow speed along parts of the working path where the workpiece 2 does not exist, resulting in lost working time.

SUMMARY OF THE INVENTION

The present invention has been attained in view of the above-mentioned problem in the prior art, and an object of the present invention is to provide an NC working process in which the moving speed of a tool in a range of non-working movement of the tool is sufficiently increased relative to the moving speed during normal working, in accordance with the shape of the work before machining, to thereby reduce the time wasted due to non-working movement of the tool.

To attain the above-mentioned object, the NC working process according to the present invention is characterized in that data on the shape of the workpiece before working is inputted in advance, and the data on the shape and the working path of the tool as determined on the basis of the desired final shape are compared with each other to judge whether the tool is outside of the inputted workpiece shape or not, so that the tool may be caused to move at a high speed when the tool is outside of the workpiece shape.

The above and other objects, features and advantages of the present invention will be apparent from the following detailed description of preferred embodiments of the invention in conjunction with the accompanying drawings.

BRIEF DESCRIPTION OF THE DRAWINGS

FIG. 10A, 10B are diagrams explaining the setting of the working path;

FIG. 11 is a flowchart for processing step 103 of the flowchart of FIG. 9;

DETAILED DESCRIPTION OF THE PREFERRED EMBODIMENTS

Figure 1:
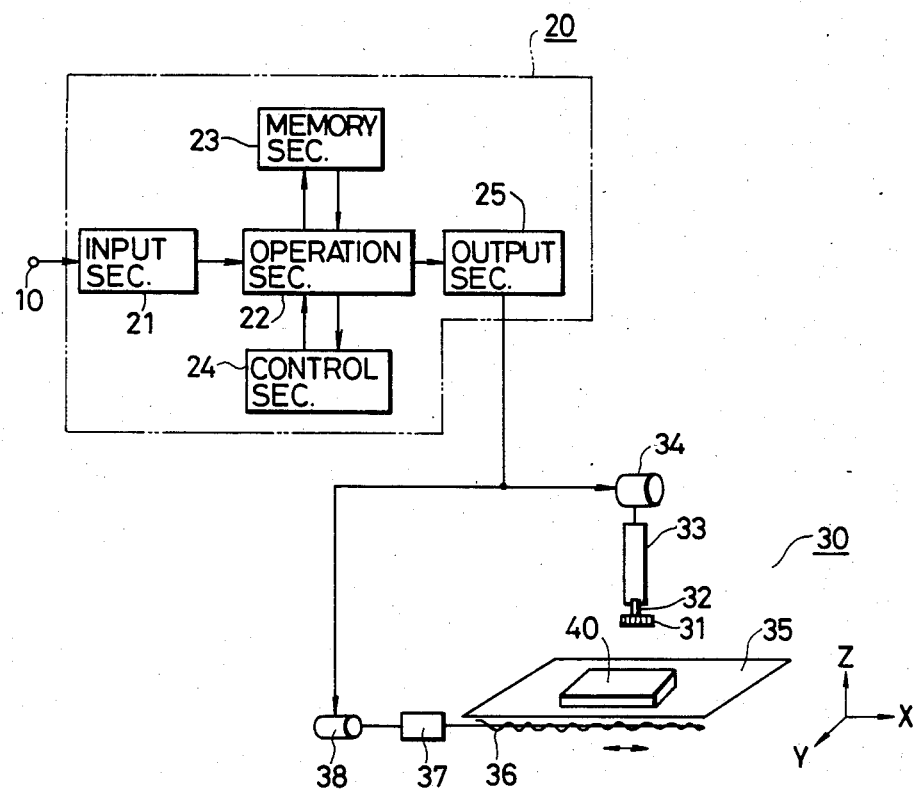
FIG. 1 is a schematic diagram explaining the constitution of a typical NC working machine.
Figure 2:
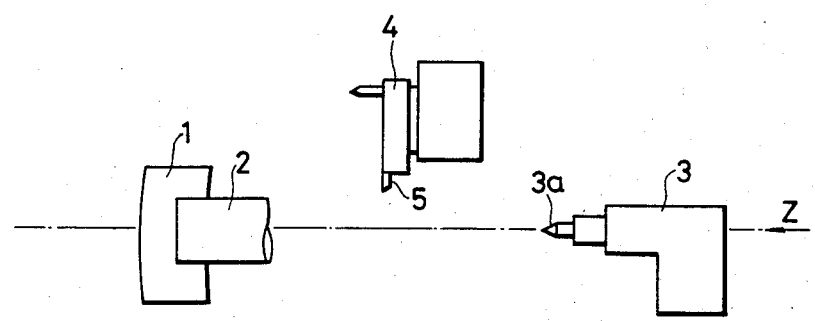
FIG. 2 is a schematic diagram showing a lathe.
Figure 3:
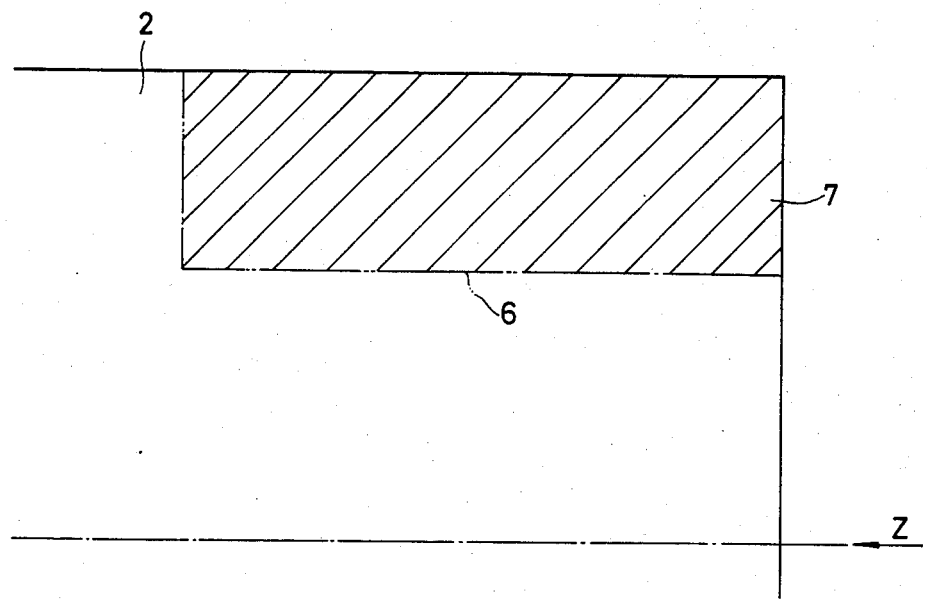
FIG. 3 is a diagram showing a workpiece and the final shape thereof.
Figure 4:
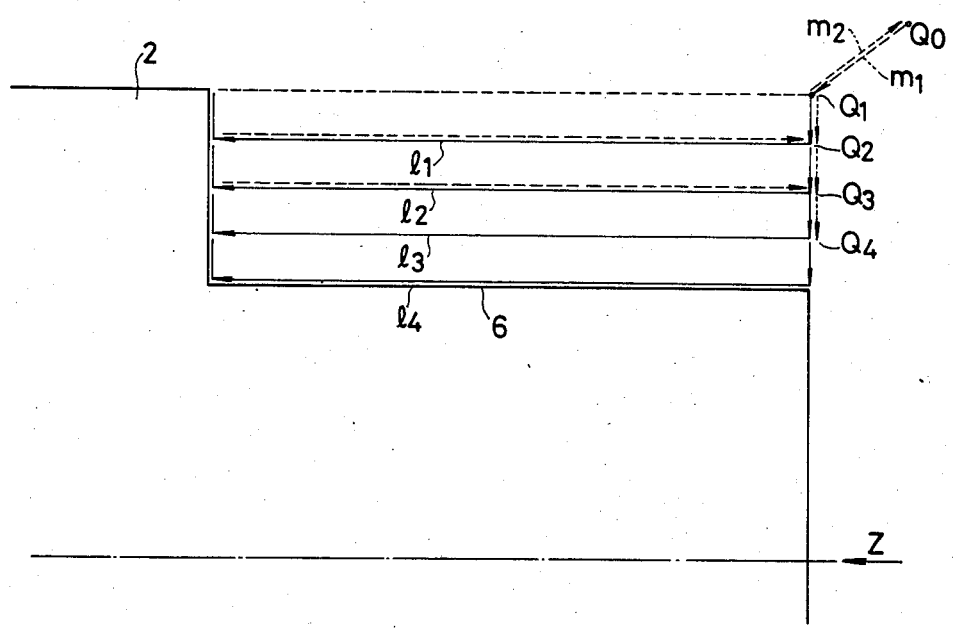
FIG. 4 is a diagram showing the working path for obtaining this final shape.
Figure 5:
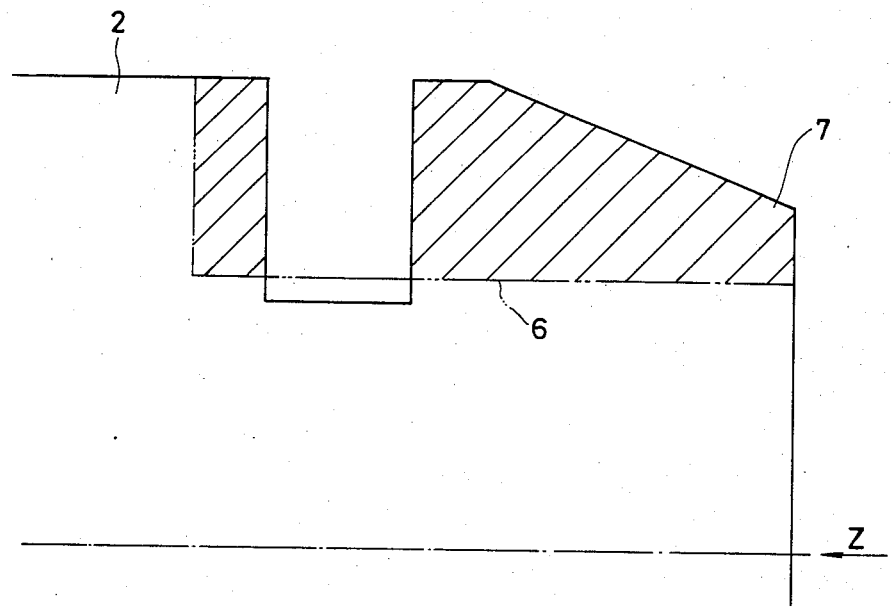
FIG. 5 is a diagram bhowing an example of a work which has been cut in advance.
Figure 6:
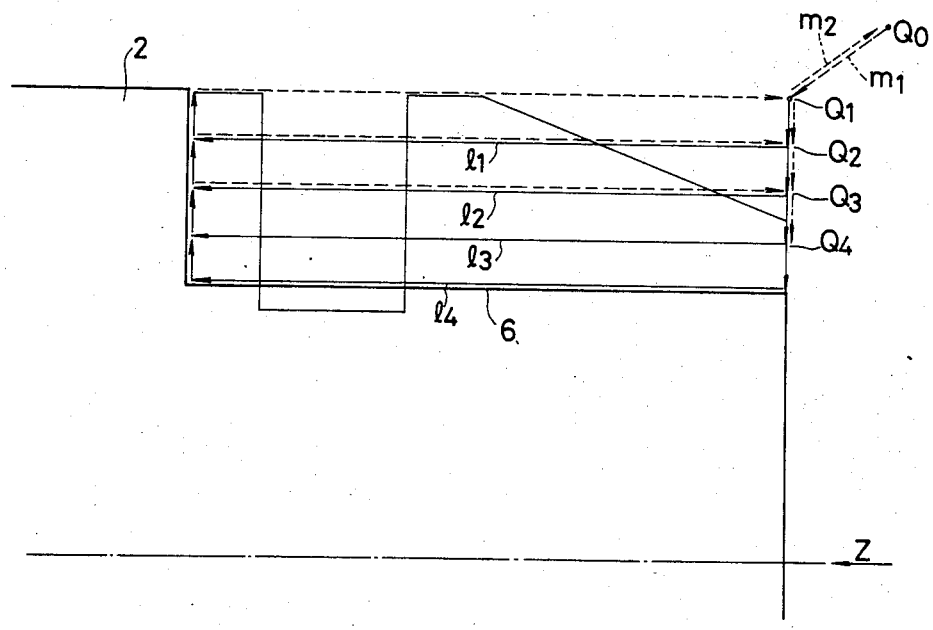
FIG. 6 is a diagram showing the working path for obtaining this final working shape.
Figure 7:
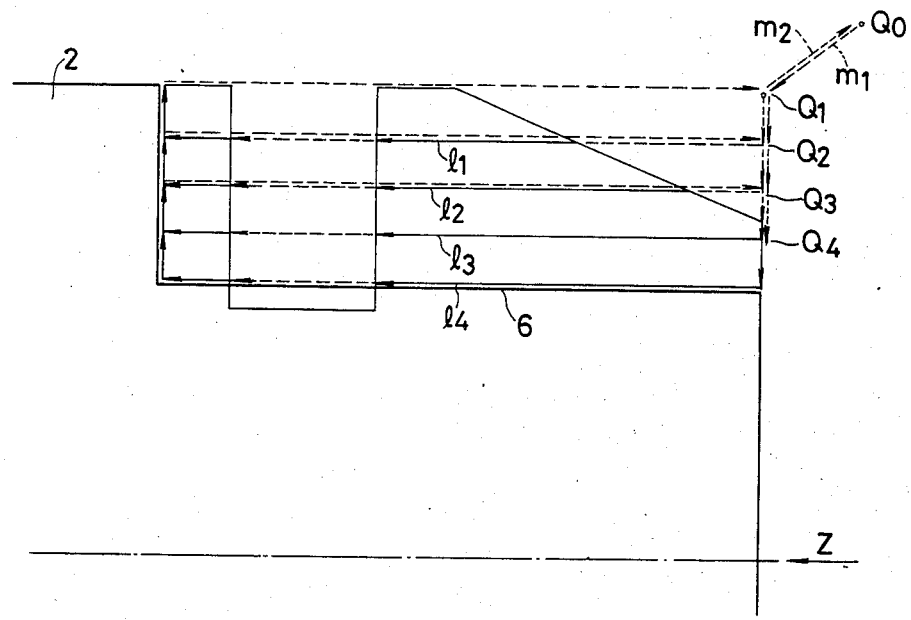
FIG. 7 is a diagram showing the working path and the tool feed speed in a case when the present invention is applied.

FIG. 7 shows the working path and the speed of the tool. This embodiment is set to obtain the final shape 6 for the preworked work 2 as shown in FIG. 5. The working path per se of FIG. 7 is quite the same as that shown in FIG. 8, but the moving speed of the tool is different. That is, in FIG. 7, the working path indicated by a solid line shows a range in which cutting is actually effected into the work (an actual working region) and in which the tool is fed at a relatively slow cutting speed, while the dotted line indicates a range in which the tool is idly moved without cutting the work (an idle or non-working movement region) and in which the tool is moved at a high speed.

Figure 8:
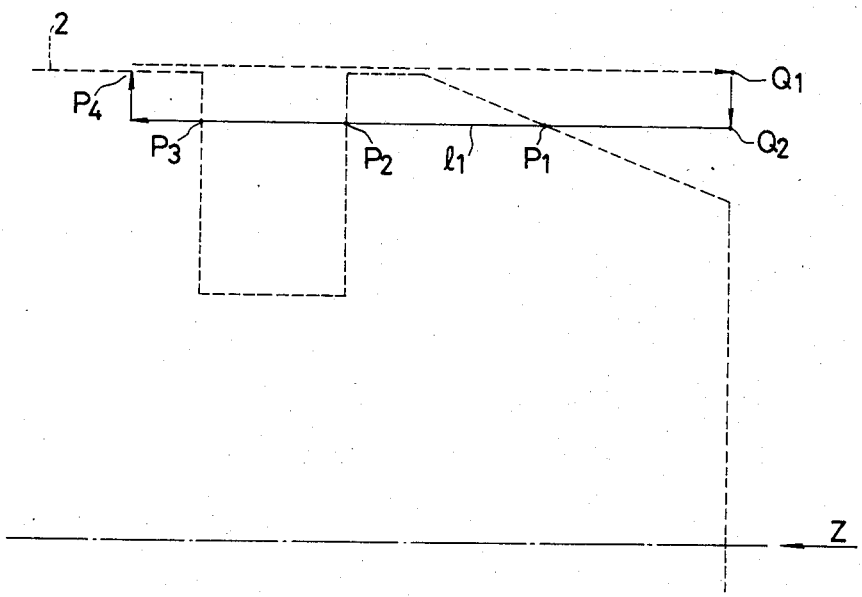
FIG. 8 is a diagram explaining a method of distinguishing the actual working region and the non-working or idle movement region from each other.

FIG. 8 shows a method of distinguishing the actual working region and the idle movement region from one another. According to the present invention, data as to the shape of the work before machining is inputted in advance. The data on the shape of the workpiece before machining and the working path (represented by $l_1$ in FIG. 8) obtained on the basis of the finished shape 6 of the work are compared with each other so as to first obtain the points of intersection therebetween. In FIG. 8, $P_1$, $P_2$, $P_3$ and $P_4$ represent the respective points of intersection. Since the working start point $Q_1$ is outside the work shape, the path from the working start point $Q_1$ to the point of intersection $P_1$ is an idle movement region and the tool is caused to move at a high speed in this region. The path from the point of intersection $P_1$ to the point of intersection $P_2$ is an actual working region, and therefore the tool is caused to move at a low cutting speed. Next, the path from the point of intersection $P_2$ to the point of intersection $P_3$ is an idle movement region, and therefore the tool is caused to move at a high speed. The path from the point of intersection $P_3$ to the point of intersection $P_4$ is an actual working region and therefore the tool is caused to move at a low cutting speed. This process is repeated, and the idle movement regions and actual working regions are also obtained for the other working paths $l_2$, $l_3$ and $l_4$, to thereby switch the tool feed speed for the respective regions.

Figure 9:
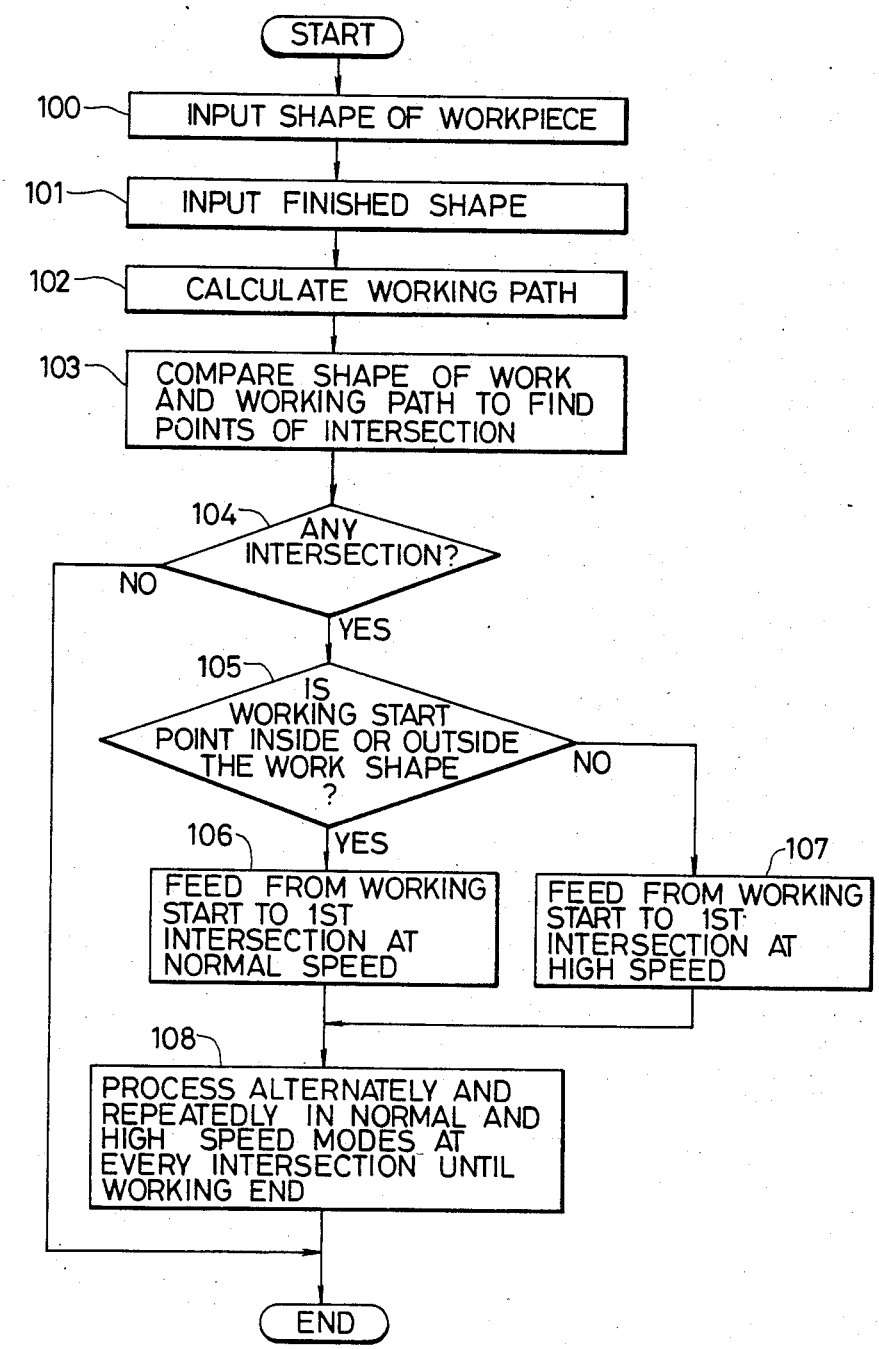
FIG. 9 is a flowchart showing the processing procedure of a first embodiment in which the NC working process according to the present invention is applied.

FIG. 9 is a flowchart showing the processing procedure when the above-described NC working process according to the present invention is used.

This flowchart will be described hereunder.

First, the shape of the workpiece before working is inputted (step 100), which is the information relating to the shape of the path from the start point to the end point at the inner or outer periphery of the work as represented by line segments and/or circular arcs. More particularly, in the case of a line segment, the coordinate values X and Z of the end point of the line segment are set as shown in FIG. 10(a), and in the case of a circular arc, the coordinate values I and J of the center of the arc, the doordinate values X and Z of the end point, the value of the radius and the direction of rotation CW or CCW are set as shown in FIG. 10(b). The figure determined by these values is the work shape and these values are inputted as the information on the work shape.

Next, the desired finished shape of the work is inputted (step 101). Similarly to the work shape, the finish shape is expressed by line segments and/or circular arcs, and the information thereon is inputted.

Subsequently, the working path for the tool is automatically determined on the basis of the finished shape (step 102). This is performed such that an LAP path is automatically calculated on the basis of the preset finished shape, the cutting start point and the amount of cutting, and the working path for machining the work at a position shifted from the cutting start point by the amount of cutting is formed and extracted.

The data on the shape of the work before machining and the working path are compared with each other to obtain the points of intersection therebetween (step 103).

In this case, the working path causes the tool to laterally cut the work in the Z-direction from the cutting position and therefore it will suffice to judge only whether the X coordinate value of the cutting position intersects the work shape or not. The work shape is a combination of line segments and/or circular arcs and therefore it will suffice to judge whether each of the line segments and/or circular arcs has a point of intersection at this X coordinate value. This operation may be expressed by a flowchart as shown in FIG. 11.

On the basis of this step, when there exists a point of intersection, judgement is made as to whether or not the working start point is outside the work shape (step 105).

In the case where the working start point is outside the work shape, the first tool feed speed is set at the high speed, while in the case where it is inside the work shape, the first tool feed speed is set at the low speed (step 107). Thereafter, every time the tool has reached a point of intersection, the tool feed speed is alternatively switched from high speed to low speed or vice versa (step 108). The judgement as to whether the tool is outside the work shape or not is performed in a manner such that if the tool is on the (+) side in the X-direction from the work shape in working the outer periphery of the work, or on the (−) side in working the inner periphery, it is judged that the tool is outside the work shape, while if the tool is on the (−) side ((+) side) in the X-direction from the work shape in working the outer (inner) periphery of the work, respectively, it is judged that the tool is inside the work shape. In the idle feed region, the tool feed speed may be set to several times the cutting speed, or alternatively may be set to another suitable value.

Figure 12:
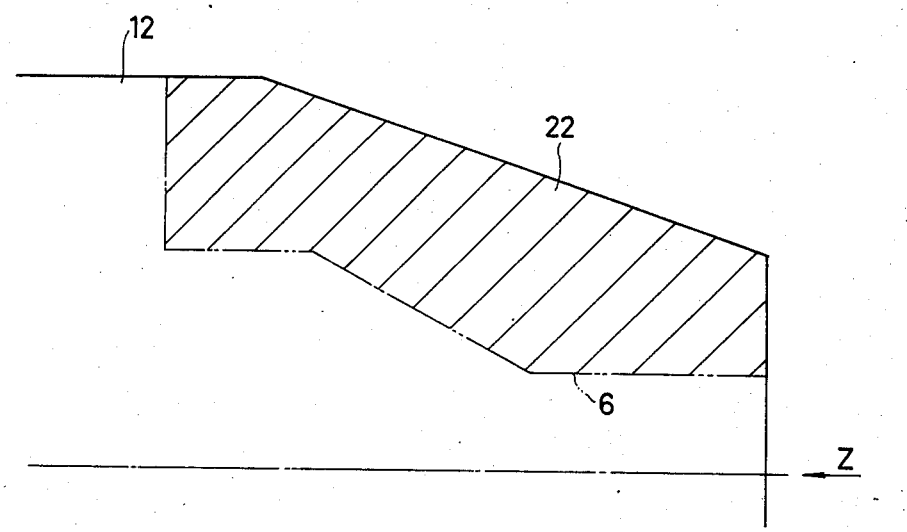
FIG. 12 is a diagram showing another example of a work which has been cut in advance.
Figure 13:
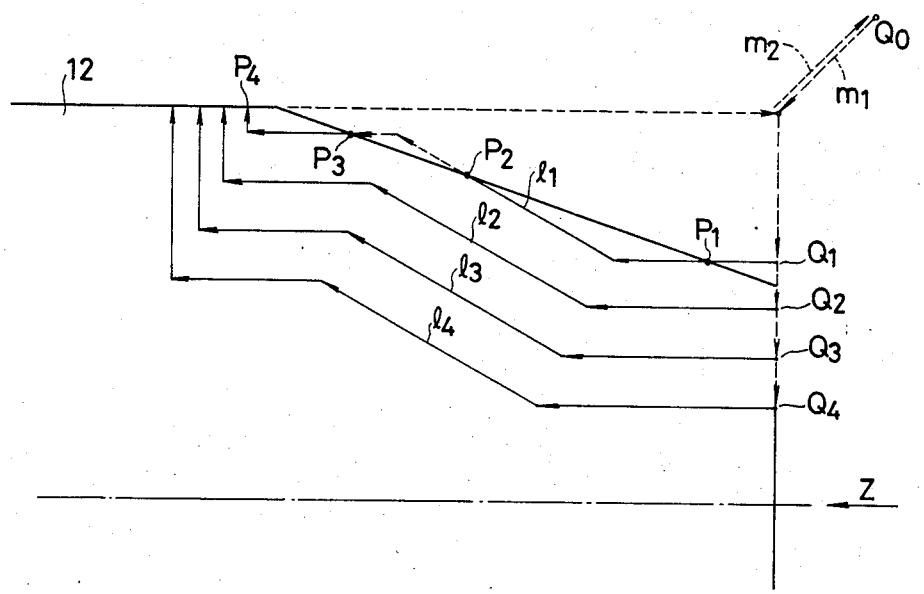
FIG. 13 is a diagram explaining the actual working region and the idle movement region.

FIGS. 12 and 13 show another embodiment of the present invention in which the working path of profile cutting is formed on the basis of the finished shape of the work. FIG. 12 shows an example of a work 12 which has been cut in advance, and the final working shape 6 is indicated by a two-dot chain line. The working path in this case consists of working path elements $l_1, l_2, l_3$ and $l_4$ as shown in FIG. 13 The tool 5 moves in the order of the working original point $Q_0 \rightarrow$ a path $m_1 \rightarrow$ a first working start point $Q_1 \rightarrow$ a working path element $l_1 \rightarrow$ a second working start point $Q_2 \rightarrow$ a working path element $l_2 \rightarrow$ a third working start point $Q_3 \rightarrow$ a working path element $l_3 \rightarrow$ a fourth working start point $Q_4 \rightarrow$ a working path element $l_4 \rightarrow$ a path $m_2 \rightarrow$ the original point $Q_0$ to thereby obtain the final shape 6. In the conventional working process, when the final shape is inputted, the working path is determined regardless of the shape of the work before machining and therefore the idle movement of the tool increases, resulting in a waste of usable working time. Accordingly, similarly to the first embodiment, the shape of the work is inputted in advance and the data on the inputted shape is compared with the above-mentioned working path so that a judgement is made as to whether the tool is outside the above-mentioned work shape or not, so as to cause the tool to move at a high speed when the tool is outside the work shape.

That is, the working path, as indicated by a solid line in FIG. 13, includes a range in which cutting is actually effected on the work (an actual working region) and in which the tool is fed at the relatively slow cutting speed. The dotted line indicates the range in which the tool is idly moved without cutting the work (an idle movement region) and in which the tool is caused to move at a high speed.

The actual working region and the idle movement region are distinguished from each other as follows. The data as to the shape of the work 12 before machining is inputted in advance. The data on the shape before working and the working path (represented by $l_1$ in FIG. 13) obtained on the basis of the finished shape 6 of the work 12 are compared with each other so as to first obtain the points of intersection therebetween. In FIG. 13, $P_1, P_2, P_3$ and $P_4$ represent the respective points of intersection. Since the working start point $Q_1$ is outside of the work shape, the path from the working start point $Q_1$ to the point of intersection $P_1$ is an idle movement region and the tool is caused to move at a high speed in this region. The path from the point of intersection $P_1$ to the point of intersection $P_2$ is an actual working region and therefore the tool is caused to move at a low cutting speed. Next, the path from the point of intersection $P_2$ to the point of intersection $P_3$ is an idle movement region and therefore the tool is caused to move at high speed. The path from the point of intersection $P_3$ to the point of intersection $P_4$ is again an actual working region and therefore the tool is caused to move at the low cutting speed. This process is repeated in subsequent idle movement and actual working regions with respect to the other working paths $l_2, l_3$ and $l_4$, to thereby switch the tool feed speed for the respective regions.

Although the basic procedure for the above-mentioned process in the second embodiment is quite the same as shown in the flowchart of FIG. 9 for the first embodiment, the particular processing is of course different from the latter, as described above, in determining the working path in step 102 and in determining the points of intersection between the work shape and the working path in the step 103. This example is also different in the processing of steps 106 to 108, in that the working path has to be traced in the second embodiment, while the points of intersection are merely connected by a straight line in the first embodiment.

What is claimed is:

1. A numerically controlled working process for performing the machining of a work, comprising the steps of:
    (a) inputting to a numerically controlled working machine first data representative of the shape of said work before machining as a work shape, said work shape including a recess enclosed on both sides in a first direction;
    (b) inputting to said machine second data representative of a desired finished shape of said work;
    (c) causing said machine to determine a working path for said tool on the basis of said second data of said finished shape;
    (d) causing said machine to compare the first data on said work shape with said working path to obtain the point or points of intersection therebetween;
    (e) causing said machine to determine whether a working start point is outside said work shape when said point or points of intersection exist;
    (f) causing said machine to set a first tool feed speed for movement in said first direction at a high value when said working start point exists outside said work shape and to set the first tool feed speed to a low value when said working start point exists inside said work shape; and
    (g) causing said machine to switch the tool feed speed alternatively between said high value and said low value every time said tool reaches each said point of intersection.

2. A numerically controlled working process according to claim 1, wherein said first and second data are inputted as information in the form of line segments and/or circular arcs representing the shape from the start point to the end of each of said work shape and of said finished shape.

3. A numerically controlled working process according to claim 1, wherein said machine calculates said working path of said tool on the basis of said second data of said desired finished shape, a cutting start point, and the amount of cut.

4. A numerically controlled working process according to claim 1, wherein the point or points of intersection between said work shape before machining and said working path is obtained by said machine by judging whether an X-coordinate value of the cutting position intersects said work shape before machining.

5. A numerically controlled working process according to claim 4, wherein the determination as to whether the tool is outside said work shape or not is made on the basis of whether the tool is at the (+) side or at the (−) side, in the X-direction, from said work shape.

* * * * *